United States Patent [19]

Hirukawa et al.

[11] Patent Number: 4,951,640

[45] Date of Patent: Aug. 28, 1990

[54] METHOD OF CONTROLLING IGNITION OF INTERNAL COMBUSTION ENGINE

[75] Inventors: Itsushi Hirukawa; Satoshi Aoki; Noboru Kudoh, all of Hamamatsu, Japan

[73] Assignee: Sanshin Kogyo Kabushiki Kaisha, Hamamatsu, Japan

[21] Appl. No.: 405,565

[22] Filed: Sep. 8, 1989

[30] Foreign Application Priority Data

Sep. 9, 1988 [JP] Japan .................................. 63-225963

[51] Int. Cl.$^5$ ............................................. F02P 9/00
[52] U.S. Cl. .............................. 123/335; 123/198 DC
[58] Field of Search ........ 123/335, 334, 418, 198 DC; 322/38, 91, 29; 310/70 A

[56] References Cited

U.S. PATENT DOCUMENTS

| | | | |
|---|---|---|---|
| 4,385,601 | 5/1983 | Orova et al. | 123/335 |
| 4,459,951 | 7/1984 | Robinaga et al. | 123/198 DC |
| 4,664,080 | 5/1987 | Minks | 123/335 |
| 4,883,033 | 11/1989 | Hosoe et al. | 123/335 |
| 4,894,602 | 1/1990 | Davis et al. | 322/38 |

Primary Examiner—Raymond A. Nelli
Attorney, Agent, or Firm—Ernest A. Beutler

[57] ABSTRACT

An ignition control system for an internal combustion engine of the type employed to power a watercraft wherein the engine speed is reduced upon the sensing of an abnormal engine condition. When the engine speed is reduced, the spark timing is also retarded to avoid backfiring in the exhaust system unless the engine conditions indicate that the exhaust gas temperatures might become too high under this retarded condition.

14 Claims, 5 Drawing Sheets

METHOD OF CONTROLLING IGNITION OF INTERNAL COMBUSTION ENGINE

BACKGROUND OF THE INVENTION

This invention relates to a method of controlling the ignition of an internal combustion engine and more particularly to an improved engine ignition control system.

It is well known to equip internal combustion engines with some form of protective device which will, in response to a predetermined engine abnormal condition, reduce the speed of the engine so as to prevent damage. Such devices may reduce the speed of the engine in response to a number of conditions such as overheating, lack of adequate lubrication pressure, or lack of adequate cooling liquid flow through the engine cooling jacket. All of these arrangements employ one or more sensing devices for sensing at least one of the noted abnormal engine conditions and for giving an alarm when such abnormal condition occurs. When there is such an abnormality noted, the speed of the engine is reduced so as to protect the engine. The speed reduction may be accomplished either by interrupting the firing of the spark plugs or by force misfiring of the spark plugs or a combination of the two.

When the engine is slowed in this manner, there is the possibility that burning may either continue or become initiated in the exhaust system. Such conditions are known as backfiring or firing back and result from the admission of a combustible mixture into the exhaust system. In order to provide such backfiring or firing back in the exhaust system, many of these devices also employ an arrangement for retarding the spark when the engine speed is being reduced in the aforenoted manner, which spark retardation has the effect of precluding the likelihood of backfiring in the exhaust system.

Although such combined spark interruption and/or misfiring with spark retardation is effective in protecting the engine and also precluding firing back, it can have the effect of increasing the temperature in the exhaust system. There are many instances when such temperature elevation in the exhaust system is undesirable. For example, in marine applications, it is the normal practice to cool the exhaust gases by adding cooling water to them when they are discharged from the engine. Because of the fact that the exhaust gases are normally cooled, it is possible to use rubber or elastomeric expansion joints in the exhaust system. However, if the exhaust temperature becomes too high due to the reduction of the engine speed by misfiring or interrupted firing and retardation of the spark, these elastic joints can be damaged.

It is, therefore, a principal object of this invention to provide an improved method and apparatus for controlling the ignition of an internal combustion engine so as to slow the speed of the engine in the event an abnormal condition is sensed, to insure against backfiring in the exhaust system and also so as to insure that the exhaust system does not become overheated under such slowing conditions.

It is a further object of this invention to provide an improved method and apparatus for controlling the spark advance during engine slowing because of an abnormal condition in such a manner that backfiring and excess exhaust gas temperatures are avoided.

SUMMARY OF THE INVENTION

This invention is adapted to be embodied in an engine control system and a method of operating an internal combustion engine that has an exhaust system and an ignition system. Means are provided for sensing an abnormal engine running condition and means responsive to a sensed abnormal engine running condition reduces the engine speed by effecting misfiring of the ignition system. In addition, the spark advance is retarded for reducing the likelihood of backfiring in the exhaust system. Means are also provided for sensing a condition indicative of an overtemperature in the exhaust system for returning the spark advance toward normal during the speed reduction mode.

Another feature of the invention is also adapted to be embodied in an engine control system and method for operating an internal combustion engine that has an exhaust system and an ignition system. Means are provided for sensing an abnormal engine running condition and means are responsive to the sensed abnormal engine running condition for reducing the engine speed by effecting misfiring of the ignition system. When the engine speed is being reduced in this manner, the spark is also retarded to reduce the likelihood of backfiring occurring in the exhaust system unless the retarded spark causes an overtemperature in the exhaust system in which case the spark is not retarded.

DETAILED DESCRIPTION OF THE PREFERRED EMBODIMENT

Figure 1:
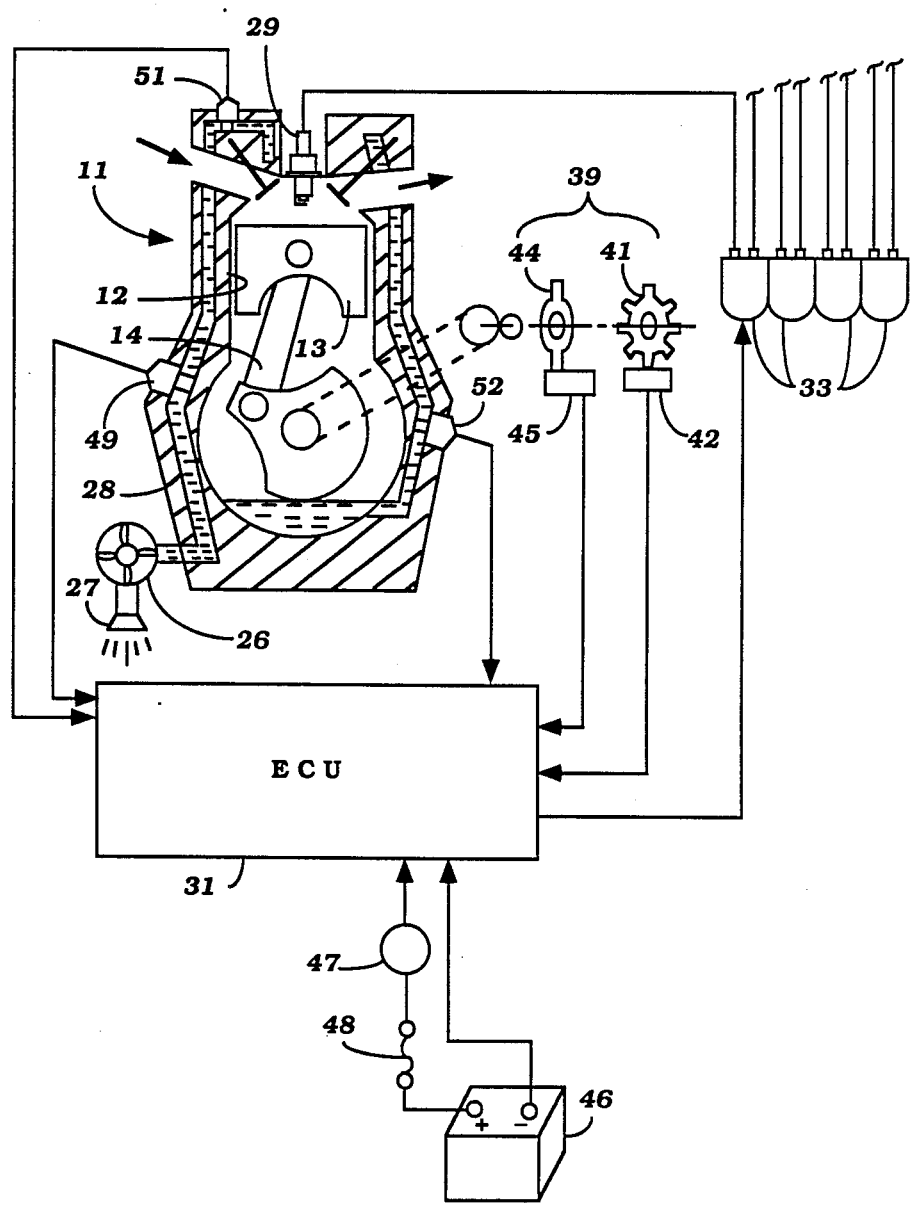
FIG. 1 is a partially schematic cross-sectional view taken through a single cylinder of a multiple cylinder internal combustion engine constructed in accordance with an embodiment of the invention.
Figure 2:
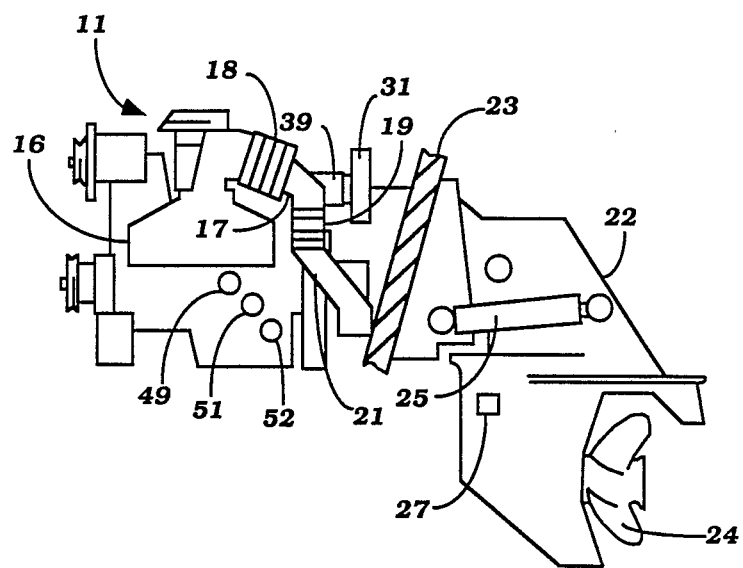
FIG. 2 is a side elevational view showing the installation of the engine in a watercraft as part of an inboard/outboard drive.

Referring now in detail to the drawings and in particular initially to FIGS. 1 and 2, an internal combustion engine constructed and operated in accordance with a preferred embodiment of the invention is identified generally by the reference numeral 11. In the illustrated embodiment, the engine 11 is of the V8 type and operates on the four-stroke cycle principle of operation. It is to be understood, however, that the engine 11 may have other cylinder numbers or configurations or, in fact, may comprise a rotary engine. In addition, the engine 11 may operate on other than the four-stroke cycle, for example, it may be a two-stroke engine.

The engine 11 includes cylinder bores 12 in which pistons 13 reciprocate. The pistons 13 are connected by means of connecting rods 14 so as to drive a crankshaft 15 in a well known manner.

FIG. 1 illustrates schematically the valves of a four-stroke engine but, as has been noted, the engine 11 may also operate on the two-stroke cycle and, for that reason, the exact method of introducing the fuel/air mixture into the engine and discharging it from the combustion chamber has not been illustrated since it is not necessary to understand the construction and operation. However, the exhaust system for the engine 11 includes exhaust manifolds 16 which receive the exhaust gases from the individuals cylinders of the cylinder banks and which deliver them to an exhaust collector pipe 17 through elastic joints 18. It should be noted that the cooling water from the engine cooling jacket, to be described, is delivered into the exhaust manifold 18 so as to cool and silence the exhaust gases as well as to cool the elastic joint 18. A further elastic joint 19 connects the collector 17 to an exhaust gas discharge pipe 21 that extends into the outboard drive unit (to be described) for discharge into the body of water in which the watercraft powered by the engine 11 is operating.

Referring now primarily to FIG. 2, the engine crankshaft 15 drives a shaft (not shown) that extends into a conventional outboard drive unit 22 that is adapted to be mounted on a transom 23 of a watercraft. The engine 11 is mounted inboard of the transom, as is common practice with inboard/outboard drives and drives a propeller 24 of the outboard drive unit through a suitable transmission mechanism as is well known in this art. The outboard drive unit 22 is also pivotal about a horizontally extending pivot axis for tilt and trim adjustment. A pair of hydraulically operated cylinders 25 provide this adjustment.

Referring again to FIGS. 1 and 2, the engine 11 is provided with a cooling system that includes a delivery pump 26 that draws water from the body of water in which the watercraft is operating through an inlet conduit 27 and delivers it to an engine cooling jacket, shown schematically at 28. The water is circulated through the cooling jacket 28 by an engine driven circulating pump (not shown) and the water having circulated through the cooling jacket 28 is discharged back to the body of water in which the watercraft is operating through the exhaust system including the elastic couplings 18 and 19 already described.

Figure 3:
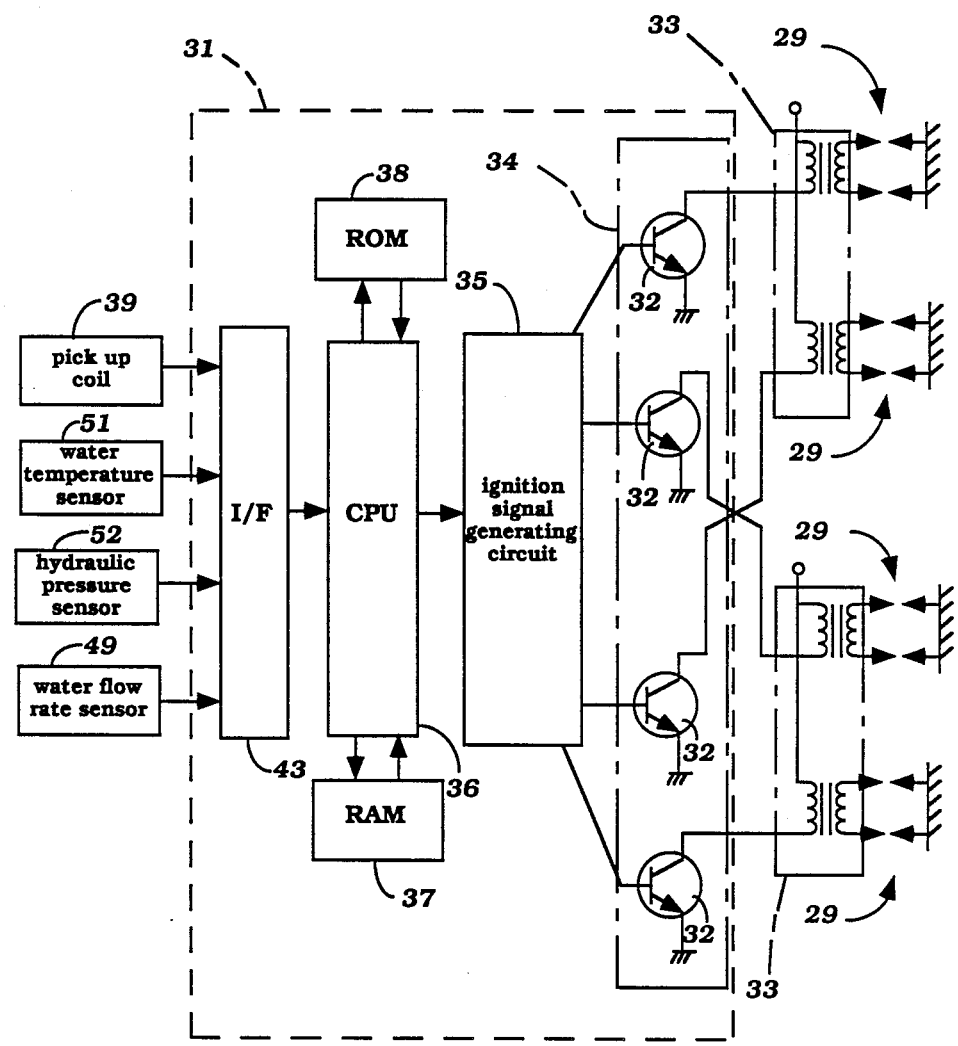
FIG. 3 is a schematic view showing the spark control circuit for the embodiment.

The engine 11 is also provided with an ignition system for firing spark plugs 29 associated with each of the combustion chambers of the engine 11. Referring now additionally to FIG. 3, the ignition system for firing the spark plugs 29 includes an electrically control unit, indicated generally by the reference numeral 31 that operates, in a manner to be described, an SCR type of ignition system that includes a plurality of control transistors 32 which when switched on become conductive and permit the discharge of a capacitor (not shown) through the primary winding of respective ignition coils 33 so as to fire the spark plugs 29. The ignition coils 33, in the illustrated embodiment, each fire two spark plugs 29. It is to be understood, of course, that a single coil 33 can be provided for each spark plug or other arrangements, well known in this art, can be incorporated.

The transistors 32 are all contained within a switching circuit 34 that is operated by an ignition signal generating circuit 35. The circuit 35 is, in turn, controlled by a CPU 36 that has associated with it a RAM 37 and ROM 38 so as to store the programs and signals, which will be described. Basically, the ignition signal generating circuit 35 determines the timing at which the transistors 32 are rendered conductive and, accordingly, the timing of the firing of the spark plugs 29.

The engine output shaft 15 drives an ignition pickup, indicated generally by the reference numeral 39, that incorporates a first toothed wheel 41 having a number of teeth which corresponds to the number of cylinders and which cooperates with a magnetic pickup 42 for generating a pulse transmitted to the electrical control unit 31 and specifically the CPU 36 through an interface 43. In addition, there is provided a further toothed wheel 44 that cooperates with a pickup coil 45 so as to generate a pulse. The two wheels 44 and 41 operate in unison so that the CPU 36 can determine which cylinder is at top dead center at a given point in time so as to control not only the spark advance but the firing order. The conventional spark advance curve may follow any of the known types of curves. Typically, this will be a curve that has a fixed spark advance at speeds below a predetermined off idle speed, a gradually increasing advance as engine speed increases, and then a fixed advance which is held at all high speeds. Of course, other curves can be followed.

The electronic control unit 31 is supplied with electrical power from a battery 46 through a main switch 47 of a circuit having a protective fuse 48.

In addition to the ignition system as already described, the engine 11 is provided with a protective device for reducing the speed of the engine in response to certain abnormal engine running characteristics. In addition, when the engine speed is reduced, the CPU also controls the ignition signal generating circuit 35 so as to either provide a retarded spark or a non-retarded spark so as to control the temperature of the exhaust gases in the exhaust system. This system includes certain sensors associated with the engine and these include a water flow rate sensor 49 that senses the amount of water being circulated through the cooling jacket 28. There is further provided a water temperature sensor 51 that senses the water temperature in the cooling jacket 28. In addition, a lubricant pressure sensor 52 is also incorporated for sensing the pressure in the engine lubricating system. The outputs from the sensors 49, 51 and 52 are all transmitted to the CPU 36 through the interface 43. In addition to the sensors as aforedescribed, it is to be understood that the engine 11 may also be provided with other sensors to sense abnormal conditions during which engine speed reduction would be desirable such as low oil level or any other abnormal condition. These inputs will also be inputted to the CPU 36 through the interface 43.

Figure 4:
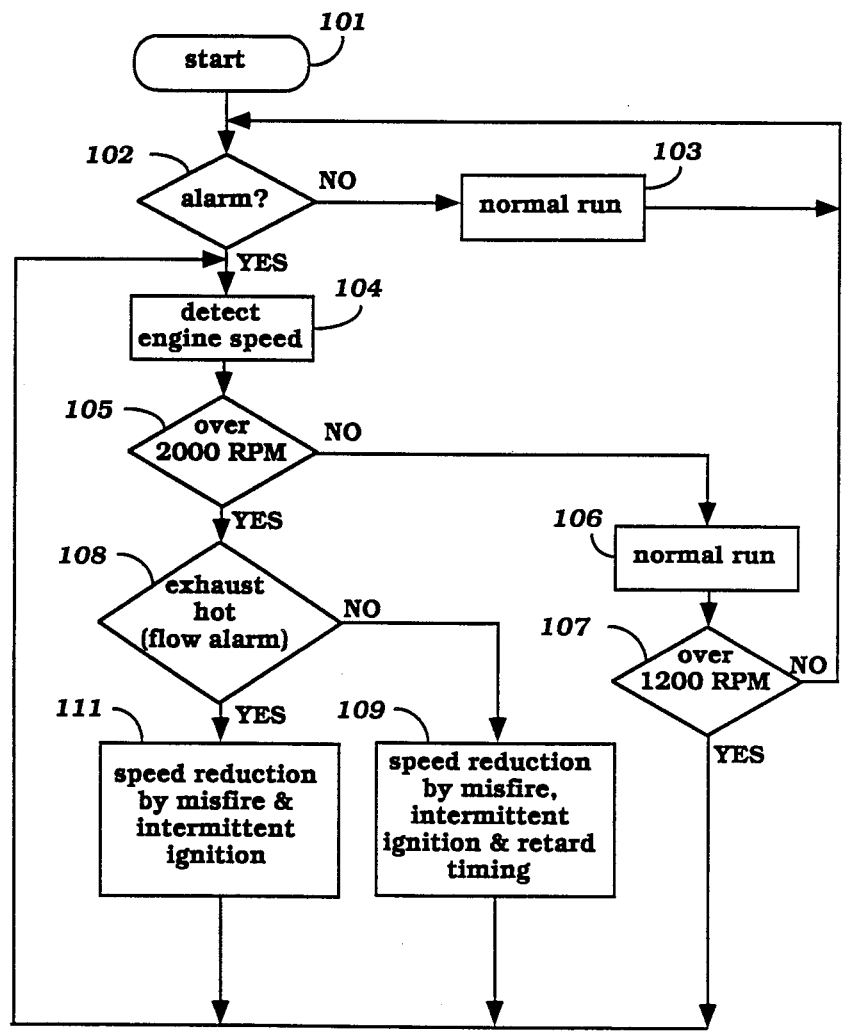
FIG. 4 is a block diagram showing the routine by which the spark control operates.

A typical control mode by which the system operates is shown in FIG. 4. The program starts at the stop 101 upon closure of the main switch 47. The program then moves to the step 102 to see if an alarm has been sounded by one of the sensors that will sense abnormal conditions such as excessive water temperature from the sensor 51, reduced lubricant pressure from the sensor 52, or inadequate water circulation as sensed by the sensor 49. If no alarm has been sounded, the program moves to the step 103 to have the CPU 36 fire the spark plugs 29 at the normal angle of the crankshaft 15 for the speed at which the engine 11 is running.

If, however, the program determines at the step 102 that an alarm has been sounded, the program moves to the step 104 wherein actual engine speed is measured. It is to be understood that the CPU can compute engine speed from the output of the pulser coil 45 in a well known manner. The program then moves to the step 105 to determine if the engine speed is over a predetermined minimum engine speed at which speed reduction is deemed to be necessary. As an example, this speed may be 2,000 rpm and this is determined at the step 105.

If, at the step 105 it is determined that the speed is not over 2,000 rpm, the program then moves to the step 106 wherein normal engine ignition is accomplished. When normal ignition timing is being delivered to the spark plugs 29, the program moves to the step 107 so as to determine if the engine speed is over 1,200 rpm. If the engine speed is not over 1,200 rpm, the program returns to the step 102 to determine if the alarm has still been sounded. If the engine speed has been reduced by the program and the abnormal condition no longer occurs, the program can then follow through the predetermined normal routine.

If, however, at the step 105, the CPU 36 determines that the engine speed is over 2,000, then the program moves to the step 108 so as to determine which of the speed reduction methods will be accomplished. At the step 108, the program determines if there is a condition under which the exhaust system may become overheated. This is accomplished in the illustrated embodiment by determining the output of the hydraulic water flow rate sensor 49 because if the water flow rate is too low such as may occur if the outboard unit 22 is trimmed up so that the water inlet 27 is not fully submerged, then the exhaust will be overheated. Alternatively, the actual temperature of the exhaust manifold may be measured.

If the running condition is such that the exhaust temperature will not be too high, the program moves to the step 109 where speed reduction is achieved by misfiring, intermittent firing and also retarding the spark timing curve so as to reduce the likelihood of backfiring in the exhaust system. If, however, it is determined at the step 108 that the conditions are such that the exhaust system temperature may become too high, then the program moves to the step 111 wherein the speed reduction is accomplished only by misfiring and intermittent firing of the engine ignition system. That is, there is no retardation of the timing and, hence, the exhaust temperature will be controlled.

Figure 5:
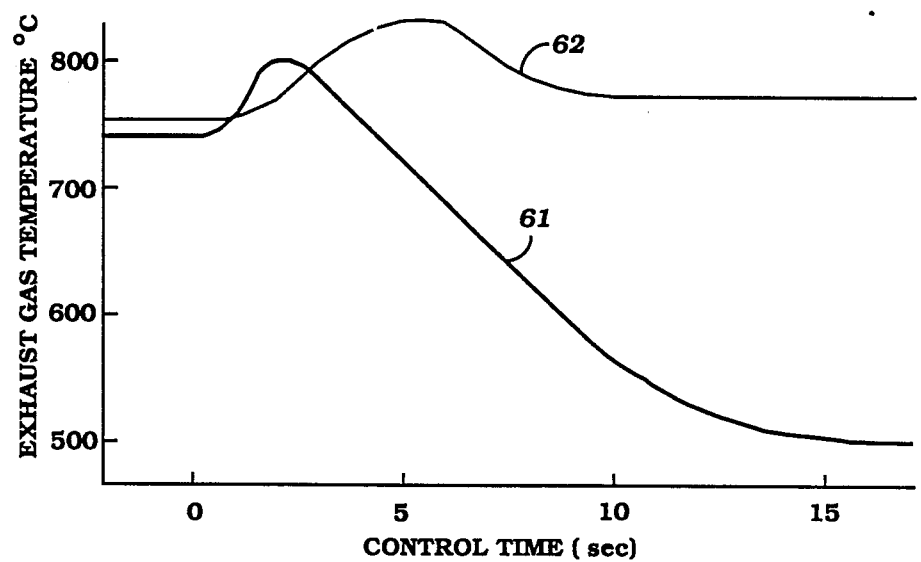
FIG. 5 is a graphical analysis showing the exhaust gas temperature versus control time with the two alternative control routines.
Figure 6:
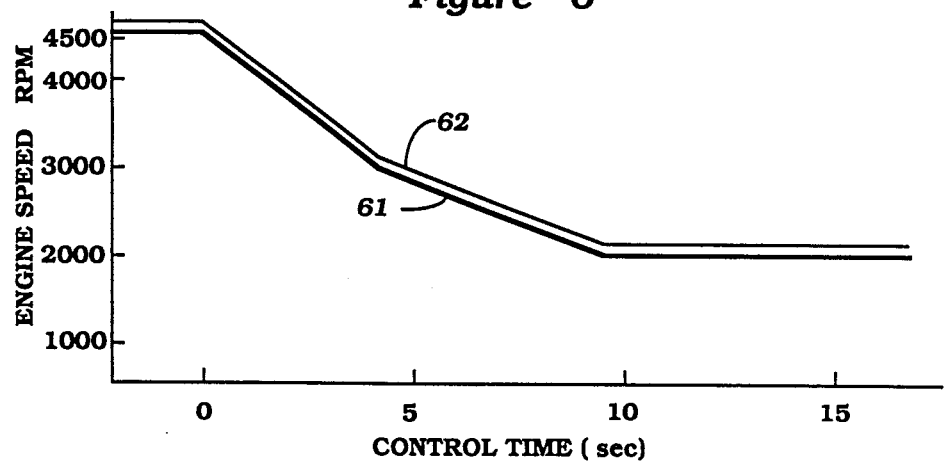
FIG. 6 is a graphical analysis showing the engine speed with respect to control time with the two alternative modes of control.

The way the system operates to control the temperature and speed can be best understood by reference to the graphical analyses in FIGS. 5 and 6. These curves show the relationship with respect to control time of exhaust gas temperature (FIG. 5) and engine speed (FIG. 6). Assuming that the engine was running at 4,500 rpm at the time the alarm was sounded, the program will at this time achieve engine speed reduction by one of the two manners described. The curve 61 shows the effect of speed reduction by misfiring and intermittent ignition only at indicated by the block 111 while the curve 62 shows the effect of speed reduction by the method shown in block 109 that also includes retarded timing. It will be seen that at the time zero when the alarm is sounded that there will be a rise in exhaust gas temperatures along with a reduction of engine speed under either method for a brief period of time. The engine exhaust gas temperature rises more steeply, however, with the curve that does not employ the retarded timing. However, as soon as the speed has dropped a small amount, the temperature curve will fall off sharply and the exhaust gas temperatures will be lowered. On the other hand, if the curve 61 is followed, the exhaust temperature rises more slowly but reaches a higher peak and then levels off at a high temperature which is nearly as high as the peak exhaust gas temperature that occurs on the curve 61 but which lasts for a longer period of time. As a result, in the effect that situations exist that would cause the exhaust gas temperature to rise significantly, the system will shift from the curve 62 to the curve 61 and reduce the engine speed without retarding the timing so as to provide overtemperature protection.

It should be readily apparent from the foregoing description, therefore, that a very effective engine control is provided and one which will insure against backfiring in the exhaust system but which will also insure that the exhaust temperature does not become so high as to cause a problem. Although an embodiment of the invention has been illustrated and described, various changes and modifications may be made without departing from the spirit and scope of the invention, as defined by the appended claims.

We claim:

1. In an engine control system for an internal combustion engine having an exhaust system, an ignition system, means for sensing an abnormal engine running condition, means responsive to a sensed abnormal engine running condition for reducing engine speed by effecting misfiring of the ignition system and for retarding the spark advance of said ignition system for reducing the likelihood of backfiring occurring in said exhaust system, and means for sensing a condition indicative of an overtemperature in said exhaust system for returning the spark advance toward normal during the speed reduction mode.

2. In an engine control system as set forth in claim 1 wherein the means for sensing a condition indicative of overtemperature in the exhaust system senses a condition other than exhaust temperature.

3. In an engine control system as set forth in claim 1 in combination with a watercraft wherein the engine powers the watercraft.

4. In an engine control system as set forth in claim 3 wherein the engine is water cooled by coolant delivered from the body of water in which the watercraft is operating and discharged back thereto at least in part through the exhaust system.

5. In an engine control system as set forth in claim 3 wherein the means for sensing a condition of overtemperature in the exhaust system senses the water flow through the cooling jacket of the engine.

6. In an engine control system as set forth in claim 1 wherein the engine is provided with a water cooling system including a cooling jacket and the overtemperature in the exhaust system is sensed by sensing a reduction in coolant flow through the cooling jacket.

7. In an engine control system for an internal combustion engine having an exhaust system, and an ignition system, means for sensing an abnormal engine running condition, and means responsive to a sensed abnormal engine running condition for reducing the engine speed by effecting misfiring of the ignition system, and means for sensing an overtemperature condition in the exhaust system and retarding the spark advance in the event an overtemperature exhaust condition is not sensed.

8. In an engine control system as set forth in claim 7 wherein the means for sensing a condition indicative of overtemperature in the exhaust system senses a condition other than exhaust temperature.

9. In an engine control system as set forth in claim 7 in combination with a watercraft wherein the engine powers the watercraft.

10. In an engine control system as set forth in claim 9 wherein the engine is water cooled by coolant delivered from the body of water in which the watercraft is operating and discharged back thereto at least in part through the exhaust system.

11. In an engine control system as set forth in claim 9 wherein the means for sensing a condition of overtemperature in the exhaust system senses the water flow through the cooling jacket of the engine.

12. In an engine control system as set forth in claim 7 wherein the engine is provided with a water cooling system including a cooling jacket and the overtemperature in the exhaust system is sensed by sensing a reduction in coolant flow through the cooling jacket.

13. A method for controlling the ignition system of an internal combustion engine having an exhaust system and an ignition system including the steps of sensing an abnormal engine running condition, reducing the speed of the engine in response to the sensed abnormal running condition by effecting misfiring of the ignition system, sensing a condition indicative of overtemperature in the exhaust system when the engine speed is reduced and retarding the spark advance if an overtemperature condition is not sensed.

14. A method as set forth in claim 13 wherein the engine is provided with a cooling jacket for liquid cooling of the engine and the overtemperature condition is sensed by sensing the amount of coolant flowing through the cooling system.

* * * * *